(12) United States Patent
Jeong

(10) Patent No.: US 11,749,134 B2
(45) Date of Patent: Sep. 5, 2023

(54) APPARATUS FOR PHYSICAL SOFTWARE CODING TRAINING BOOK RUNNING

(71) Applicant: BLUECOMMUNICATION, Seoul (KR)

(72) Inventor: Hee Yong Jeong, Seongnam-si (KR)

(73) Assignee: BLUECOMMUNICATION, Seoul (KR)

( * ) Notice: Subject to any disclaimer, the term of this patent is extended or adjusted under 35 U.S.C. 154(b) by 94 days.

(21) Appl. No.: 16/678,027

(22) Filed: Nov. 8, 2019

(65) Prior Publication Data

US 2020/0152079 A1    May 14, 2020

(30) Foreign Application Priority Data

Nov. 8, 2018    (KR) .................. 10-2018-0136695

(51) Int. Cl.
| | |
|---|---|
| *G06F 3/03* | (2006.01) |
| *G09B 19/00* | (2006.01) |
| *G06F 8/30* | (2018.01) |
| *G09B 5/00* | (2006.01) |
| *A63H 33/26* | (2006.01) |
| *G05B 19/042* | (2006.01) |

(52) U.S. Cl.
CPC ......... *G09B 19/0053* (2013.01); *A63H 33/26* (2013.01); *G05B 19/0426* (2013.01); *G06F 3/03* (2013.01); *G06F 8/30* (2013.01); *G09B 5/00* (2013.01); *G05B 2219/25257* (2013.01)

(58) Field of Classification Search
CPC combination set(s) only.
See application file for complete search history.

(56) References Cited

U.S. PATENT DOCUMENTS

| | | | | |
|---|---|---|---|---|
| 2015/0364060 | A1* | 12/2015 | Gupta ................ | B25J 11/001 |
| | | | | 434/118 |
| 2017/0120141 | A1* | 5/2017 | Baddoo ............... | A63F 9/0612 |
| 2019/0227775 | A1* | 7/2019 | Kim .................... | G06F 8/34 |

FOREIGN PATENT DOCUMENTS

| | | | |
|---|---|---|---|
| JP | 2003111981 A | * | 4/2003 |
| KR | 10-2009-0128631 A | | 12/2009 |
| KR | 10-2017-0092000 A | | 8/2017 |

OTHER PUBLICATIONS

HTML5—World Wide Web Consortium, Abstract, https://www.w3.org/TR/2014/REC-html5-20141028/, 2014 (Year: 2014).*

* cited by examiner

*Primary Examiner* — Bruk A Gebremichael
(74) *Attorney, Agent, or Firm* — Paratus Law Group, PLLC

(57) ABSTRACT

Disclosed is an apparatus for running a physical software coding training book. The apparatus includes: a toy control unit being connected to a Micro Control Unit (MCU) via serial communication and controlling motion of a toy through the MCU; a training content processing unit being connected to the toy control unit via HyperText Transfer Protocol (HTTP) and providing training content written in HyperText Markup Language (HTML), the training content including motion control commands for the toy; and a physical software processing unit capable of directly writing block coding-based physical software by embedding a block code editor into the training content and performing control of the toy.

7 Claims, 5 Drawing Sheets

FIG. 6

```
1  import asomebot              # Get asomebot module
2  asomebot.ready(5, 6, 7, 8)   # Connect asomebot to 5, 6, 7, and 8 pins
3
4  for i in range(10):
5      asomebot.forward()
6
7  for i in range(10):
8      asomebot.backward()
9
10 for i in range(10):
11     asomebot.turn_left()
12
13 for i in range(10):
14     asomebot.turn_right()
15
16 asomebot.home()
```

600

○ AsomeCode 1.8 | Run | Stop

[Run] [Stop] [View source]                                [Close]

☑ Prepare and start program
▶ Move forward
⟲ Repeat 10 times
▶ Rotate to the right
▶ Move backward
⟲ Repeat 10 times
⟲ Repeat 10 times
⟲ Repeat 10 times
▶ Rotate to the left
▶ Return to the initial pose

APPARATUS FOR PHYSICAL SOFTWARE CODING TRAINING BOOK RUNNING

CROSS-REFERENCE TO RELATED APPLICATION

This application claims priority to and the benefit of Korean Patent Application No. 10-2018-0136695 filed on Nov. 8, 2018, which is hereby incorporate by reference in its entirety.

BACKGROUND

The present disclosure relates to a physical software coding training technology and, more particularly, to an apparatus for running a physical software coding training book by which coding may be learned in an easy and simple manner by providing a book for coding training of physical software in the form of training content written in HyperText Markup Language (HTML).

Recently, software coding training has been included in the elementary school curriculum, which highlights the importance of coding training. Software coding training is based on a computer and may thus be combined with play or a game in order to meet the level of a trainee unlike conventional training methods.

Physical computing is one of core concepts of the computing system area, which refers to an activity of notifying a computer of real world measurements from sensors and to produce a program using the measurement values. A device which delivers a real world measurement to the computer is called a sensor, and a device which interacts with the real world according to a command given by the computer is called an actuator. In order to use sensors and actuators in a synergistic manner, only expert-level programming languages have been available so far. Recently, however, as various types of sensors are developed and distributed for everyday applications, the programming languages once regarded as being tractable only by experts may now be utilized more easily.

The Korean Patent Application Publication No. 10-2017-0092000 (Aug. 10, 2017) relates to a learning tool for software programming training. The learning tool comprises a board; a plurality of connectors disposed on the board; and a circuit layout disposed on the board and connected to the plurality of connectors electrically, where the plurality of connectors includes at least one first connector disposed along the outer boundary of the board and at least one second connector disposed inside the board. The first connector includes one through-hole penetrating the board and an electronic pattern formed on the inner sidewall of the one through-hole; and the second connector includes a plurality of through-holes penetrating the board and an electronic pattern formed on an inner sidewall of the plurality of through-holes, where the plurality of connectors may be connected to a conductive material through the respective clip cables. The circuit layout includes a communication unit connected to a computer system and a processor detecting a change in capacitance at the plurality of connectors, where the plurality of connectors are mapped to commands for executing predetermined functions or operations of the computer system; the processor transmits a command mapped to at least one connector among the plurality of connectors, the capacitance of which has been changed, to the computer system; and the computer system performs software programming according to the commands received from the learning tool.

The Korean Patent Application Publication No. 10-2009-0128631 (Dec. 16, 2009) relates to an intelligent robot training system using an intelligent robot training kit and an intelligent robot. The intelligent robot training system comprises an intelligent robot training kit including a driving means for navigating a robot, a sensor means comprising a plurality of ultrasonic sensors for obstacle detection and robot localization, a mobile receiving means having a microphone receiving a voice input such as an alarm sound or a guide sound and an output speaker installed being open on an internal coplanar member, and a control means being connected to an input and output terminals installed on one side of the outside of the mobile receiving means and controlling the respective means and being configured to allow a structure and operating principles of an intelligent robot to be examined visually; an intelligent robot implemented in a typical robot-shaped case the inside and the outside of which are equipped with the same constituting elements of the intelligent robot training kit; a prefabricated mat means in contact with a lower driving means of the intelligent robot; a training environment means comprising a wall-type obstacle means installed by being fastened to a supporting means installed in a lower part of the mat means at an arbitrary upper position of the mat means for the practice of ultrasonic sensors or image sensors and a color paper obstacle means placed at an arbitrary position of the mat means for the practice of image sensors; a communication means comprising at least one means selected from a wired LAN, a wireless LAN, and an RF device connecting the intelligent robot training kit and a remote control means controlled by the intelligent robot and a trainee; and a remote control means for a trainee configured to operate the intelligent robot training kit and the intelligent robot by transmitting a command program written by the trainee by using a control program to the intelligent robot training kit and the intelligent robot via the communication means or via a direct control means, wherein at least one of the intelligent robot training kit, the intelligent robot, or the remote control means constructs a flow diagram by combining visual symbols by using an embedded computing device, and a flow diagram developing program for driving the intelligent robot is operated according to a logical procedure of the flow diagram.

PRIOR ART REFERENCES

Patents (Patent 001) Korean Patent Application Publication No. 10-2017-0092000 (Aug. 10, 2017)
(Patent 002) Korean Patent Application Publication No. 10-2009-0128631 (Dec. 16, 2009)

SUMMARY

One embodiment of the present disclosure provides an apparatus for running a physical software coding training book that allows a user to learn coding in an easy and simple manner by providing books for coding training of physical software in the form of training content written in HyperText Markup Language (HTML).

One embodiment of the present disclosure provides an apparatus for running a physical software coding training book that allows block coding-based physical software to be written directly through training content in which a block code editor is embedded.

One embodiment of the present disclosure provides an apparatus for running a physical software coding training book that substitutes a simulation through training content for a coding tool content when the coding tool is not physically connected in the middle of running the coding training book and allows a coding result to be checked easily from the simulation.

Among embodiments, an apparatus for running a physical software coding training book comprises a toy control unit being connected to a Micro Control Unit (MCU) via serial communication and controlling motion of a toy through the MCU; a training content processing unit being connected to the toy control unit via HyperText Transfer Protocol (HTTP) and providing training content written in HyperText Markup Language (HTML), the training content including motion control commands for the toy; and a physical software processing unit capable of directly writing block coding-based physical software by embedding a block code editor into the training content and performing control of the toy.

The toy control unit may control a virtual toy preconfigured by the MCU even if the toy is not physically connected.

If a user input is received onto the motion control of the toy, the training content processing unit may generate a toy motion text command based on special tags rather than HTML tags and provide the generated command to the toy control unit.

If the motion text command is generated, the training content processing unit may pop up a toy motion view on the training content, which allows a user to check successful control of the toy by providing the user with toy states before and after motion obtained through the MCU and expressed in the form of text.

If a virtual toy is connected while the motion text command is being generated, the training content processing unit may visualize, on the toy motion view, a change process of the virtual toy based on toy states according to at least one motion interpolated adaptively based on the toy states before and after motion and an amount of change in the toy states before and after motion.

The physical software processing unit may provide a toy manipulator capable of performing real-time control of the toy and convert a motion process of the toy manipulated by the toy manipulator into at least one block code.

After randomly shuffling the order of the at least one block code, the physical software processing unit may visually provide a motion process of the toy, thereby allowing a user to duly rearrange the shuffled at least one block code.

The physical software processing unit may provide the training content with a motion manipulator that identifies type of the toy, shows, on the block code editor, at least one toy motion which may be written through coding by a user, receives the user's input, and provides the corresponding motion code to the block code editor.

BRIEF DESCRIPTION OF THE DRAWINGS

FIG. 6 illustrates an example of embedding a block code editor onto training content and coding a program that executes a series of motion by using code blocks.

DETAILED DESCRIPTION

Figure 1:
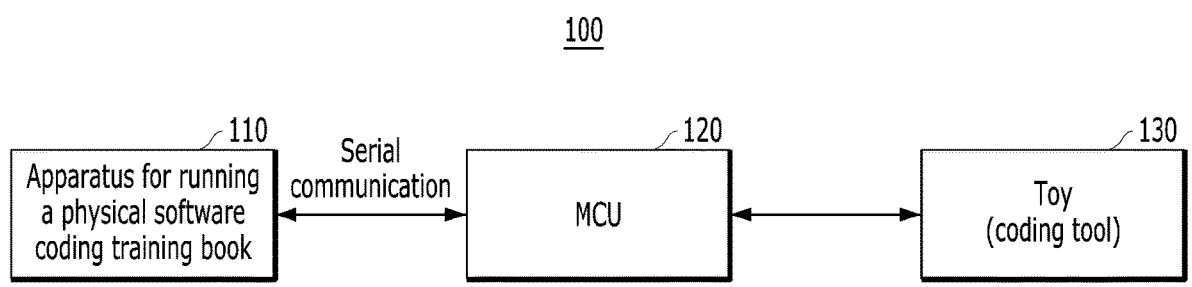
FIG. 1 illustrates a system for running a physical software coding training book according to one embodiment of the present disclosure.

Since description of the present disclosure is merely an embodiment for illustrating structural or functional description, it should not be interpreted that the technical scope of the present disclosure is limited by the embodiments described in this document. In other words, embodiments may be modified in various ways and implemented in various other forms; therefore, it should be understood that the technical scope of the present disclosure includes various equivalents realizing technical principles of the present disclosure. Also, since it is not meant that a specific embodiment should support all of the purposes or effects intended by the present disclosure or include only the purposes or effects, the technical scope of the present disclosure should not be regarded as being limited to the descriptions of the embodiment.

Meanwhile, implication of the terms used in this document should be understood as follows.

The terms such as "first" and "second" are introduced to distinguish one element from the others, and thus the technical scope of the present disclosure should not be limited by those terms. For example, a first element may be called a second element, and similarly, the second element may be called the first element.

If a constituting element is said to be "connected" to other constituting element, the former may be connected to the other element directly, but it should be understood that another constituting element may be present between the two elements. On the other hand, if a constituting element is said to be "directly connected" to other constituting element, it should be understood that there is no other constituting element present between the two elements. Meanwhile, other expressions describing a relationship between constituting elements, namely "between" and "right between" or "adjacent to" and "directly adjacent to" should be interpreted to provide the same implication.

A singular expression should be understood to indicate a plural expression unless otherwise explicitly stated. The term of "include" or "have" is used to indicate existence of an embodied feature, number, step, operation, constituting element, component, or a combination thereof; and should not be understood to preclude the existence or possibility of adding one or more other features, numbers, steps, operations, constituting elements, components, or a combination thereof.

Identification symbols (for example, a, b, and c) for individual steps are used for the convenience of description. The identification symbols are not intended to describe an operation order of the steps. Therefore, unless otherwise explicitly indicated in the context of description, the steps may be executed differently from a specified order. In other words, the respective steps may be performed in the same order as specified in the description, actually performed simultaneously, or performed in a reverse order.

The present disclosure may be implemented in the form of program code in a computer-readable recording medium, where a computer-readable recording medium includes all kinds of recording apparatus which store data that may be read by a computer system. Examples of a computer-readable recording medium include ROM, RAN, CD-ROM, magnetic tape, floppy disk, and optical data storage device. Also, a computer-readable recording medium may be distributed over computer systems connected to each other through a network so that computer-readable code may be stored and executed in a distributed manner.

Unless defined otherwise, all of the terms used in this document provide the same meaning as understood generally by those skilled in the art to which the present disclosure belongs. Those terms defined in ordinary dictionaries should be interpreted to have the same meaning as conveyed by a related technology in the context. And unless otherwise defined explicitly in the present disclosure, those terms should not be interpreted to have ideal or excessively formal meaning.

FIG. 1 illustrates a system for running a physical software coding training book according to one embodiment of the present disclosure.

Referring to FIG. 1, a system 100 for running a physical software coding training book may include an apparatus 110 for running a physical software coding training book, a Micro Control Unit (MCU) 120, and a toy 130, where the apparatus 110 for running a physical software coding training book and the MCU 120 may be connected to each other via serial communication such as RS-232C.

The apparatus 110 for running a physical software coding training book may correspond to a computing device such as a computer or a smartphone being connected to the MCU 120 and capable of running a physical software coding training book. In what follows, more detailed descriptions related to the apparatus 110 for running a physical software coding training book will be given with reference to FIG. 2.

The MCU 120 may correspond to a computing device that is embedded or connected to a toy 130 to control various motions of the toy 130. For example, the MCU 120 may be implemented as a main board capable of transmitting a programmed command to the toy 130 to make the toy 130 perform a desired motion.

The toy 130 may correspond to a coding tool capable of performing a specific motion through the MCU 120. For example, the toy 130 may be implemented as a robot or an RC car.

Figure 2:
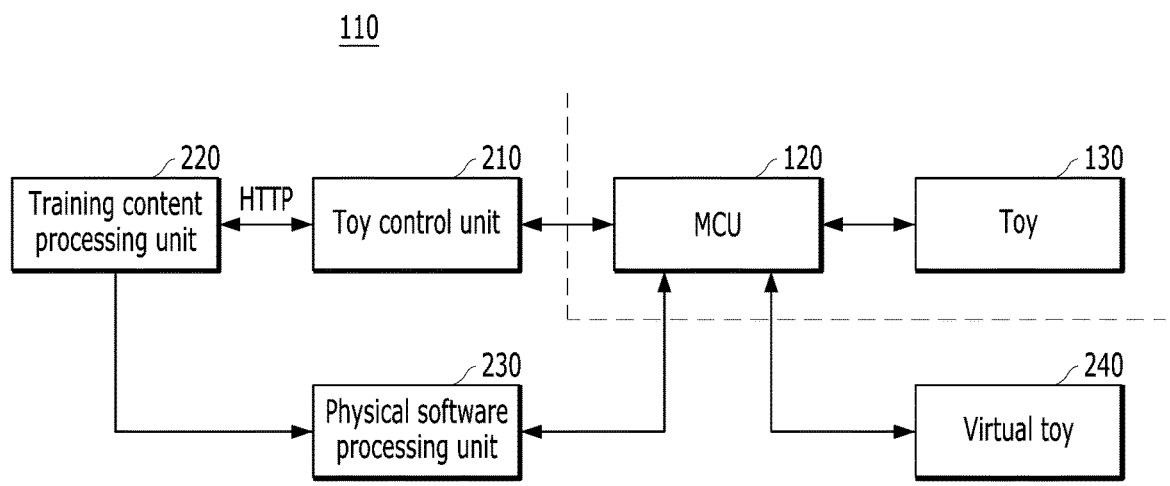
FIG. 2 is a block diagram illustrating an apparatus for running a physical software coding training book of FIG. 1.

FIG. 2 is a block diagram illustrating an apparatus for running a physical software coding training book of FIG. 1.

Referring to FIG. 2, an apparatus 110 for running a physical software coding training book includes a toy control unit 210, a training content processing unit 220, a physical software processing unit 230, and a virtual toy 240. The units 210, 220, 230 described above are configured to have at least one processor.

The toy control unit 210 is connected to the MCU 120 via serial communication and controls toy motion through the MCU 120. Here, the toy control unit 210 may control the virtual toy 240 preconfigured by the MCU 120 even if the toy 130 is not physically connected to the MCU 120.

The training content processing unit 220 is connected to the toy control unit 210 via HyperText Transfer Protocol (HTTP) and provides training content for software coding training that teaches how to program the toy 130 to perform a desired motion. Here, the training content may correspond to a coding training book written in HyperText Markup Language (HTML) describing motion control of the toy 130 and may be displayed on a webpage.

If a user input is received onto the motion control of the toy, the motion control being included in the coding training content written in HTML, the training content processing unit 220 may generate a toy motion text command based on special tags rather than HTML tags and provide the generated command to the toy control unit 210. Here, the special tag may correspond to the HTML comment. For example, to use the HTML comment, comments may be inserted between "<!- and →", which is used to modify the code or to conveniently see explanation given to the tag. The training content processing unit 220 may code the toy motion according to a user input by inserting HTML comments rather than the block code for motion process of the toy.

If the motion text command using special tags according to a user input is generated, the training content processing unit 220 may pop up a toy motion view on the training content, which allows a user to check successful control of the toy 130 by providing the user with toy states before and after motion obtained through the MCU 120 and expressed in the form of text. If the virtual toy 240 is connected while the motion text command is being generated, the training content processing unit 220 may visualize, on the toy motion view, a change process of the virtual toy based on toy states according to at least one motion interpolated adaptively based on the toy states before and after motion and an amount of change in the toy states before and after motion. Here, interpolation of toy states before and after motion may be calculated by Eq. 1 below.

$$X_p = x_1 + t(x_2 - x_1)$$

$$Y_p = y_1 + t(y_2 - y_1) \quad \text{[Eq. 1]}$$

In Eq. 1, $X_p$ and $Y_p$ are coordinates corresponding to the interpolated position; $x_1$ and $y_1$ are coordinates corresponding to the position before motion; $x_2$ and $y_2$ are coordinates corresponding to the position after motion; and t corresponds to the movement time.

The physical software processing unit 230 directly writes block coding-based physical software by embedding a block code editor into the training content and performs control of the toy 130. Here, an example of a block coding screen is shown in FIG. 6.

FIG. 6 illustrates an example of embedding a block code editor onto training content and coding a program that executes a series of motion by using code blocks.

Each individual function is defined as a block on the block coding screen 600 of FIG. 6, where actual program code is contained in each individual block. In one embodiment, the upper portion of the block coding screen 600 displays menu buttons such as run, stop, view source, and close; and individual function blocks are arranged in the form of a list. The user may code a program in an easy and simple manner by combining function blocks according to his or her desired motion. If the view source button is clicked, code content may be checked, and if the run button is clicked, a motion process of the toy 130 may be seen visually.

Referring again to FIG. 2, the physical software processing unit 230 may provide a toy manipulator capable of performing real-time control of the toy 130 and convert a motion process of the toy 130 manipulated by the toy manipulator into at least one block code.

After randomly shuffling the order of the at least one block code, the physical software processing unit 230 may visually provide a motion process of the toy 130, thereby allowing a user to duly rearrange the shuffled at least one block code. Through this operation, the user may be trained for desired motions of the toy 130 and may practice coding. Here, shuffling of order of code blocks may be performed according to Eq. 2 below.

$$|Sh(p_1, p_2, \ldots, p_k)| = \frac{(p_1 + p_2 + \ldots + p_k)!}{p_1! p_2! \ldots p_k!} \quad [\text{Eq. 2}]$$

In Eq. 2, $(p_1, p_2, \ldots, p_k)$ corresponds to the number of function blocks, and $Sh(\bullet)$ corresponds to the shuffle permutation of partitions of the totally ordered set.

The physical software processing unit 230 may provide training content with a motion manipulator that identifies type of the toy 130, shows at least one toy motion which may be written through coding on the block code editor by a user, receives the user's input, and provides the corresponding motion code to the block code editor.

Figure 3:
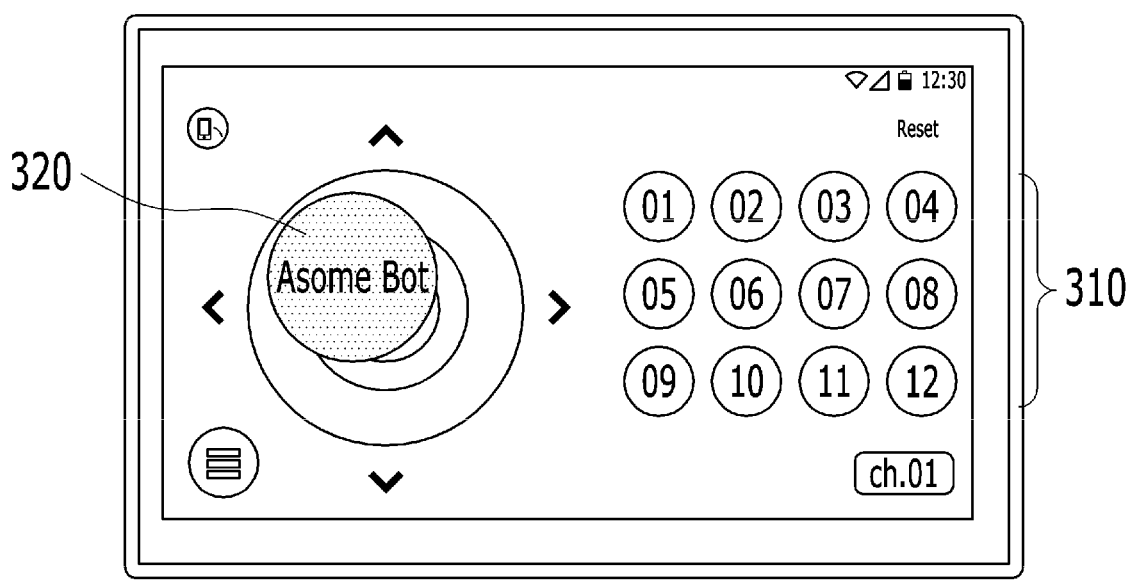
FIG. 3 illustrates an example of a toy manipulator provided by a physical software processing unit of FIG. 2.

FIG. 3 illustrates an example of a toy manipulator 300 provided by the physical software processing unit 230 of FIG. 2.

Referring to FIG. 3, the toy manipulator 300 may correspond to a software controller that acts as a joystick for controlling the toy 130. The toy manipulator 300 may include 12 number keys 310 storing basic motions and direction keys 320 storing four directional motions such as forward, backward, left-side, and right-side motion. The basic motions stored in the number keys 310 may be replaced with new motions written directly by using physical software on the block coding screen of FIG. 6.

Figure 4:
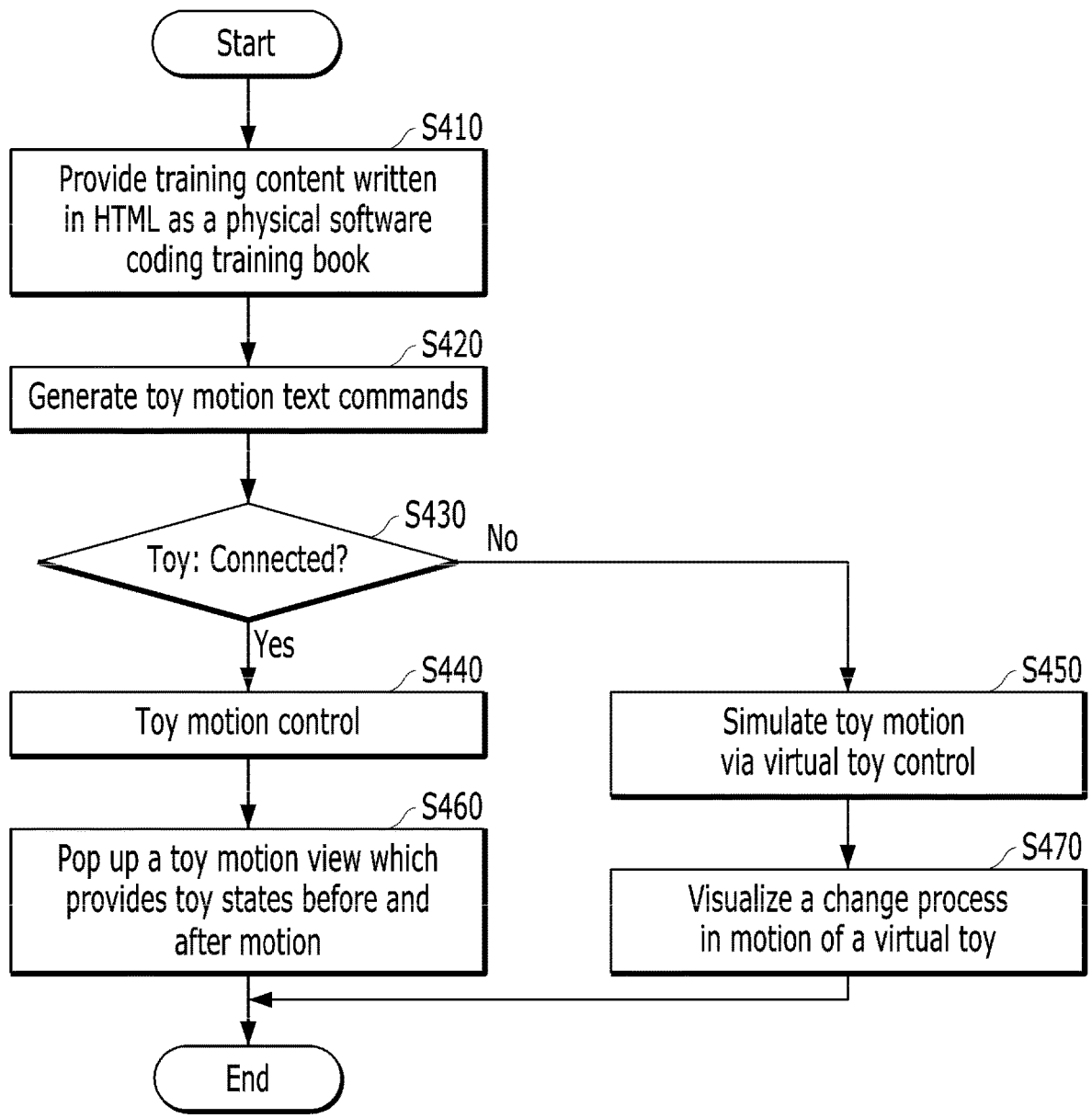
FIG. 4 is a flow diagram illustrating a process for controlling toy motion during the process for running a physical software coding training book of FIG. 2.

FIG. 4 is a flow diagram illustrating a process for controlling toy motion during the process for running a physical software coding training book of FIG. 2.

Referring to FIG. 4, the apparatus 110 for running a physical software coding training book makes the training content processing unit 220 provide training content written in HTML as a physical software coding training book S410. In one embodiment, the training content may comprise four categories of training programs such as a beginner course, an extended beginner course, an application course, and an extended application course through which a user may experience coding of the overall physical computing. The user may learn functional blocks by connecting to a web browser and exercising necessary functions for each training program of the respective categories, write program codes by combining the functional blocks and check and run the program codes.

If a user input is received to the motion control of the toy 130, the motion control being included in the training content provided, the training content processing unit 220 may generate toy motion text commands and provide the generated commands to the toy control unit 210, S420. In one embodiment, the toy motion text command may include the HTML comments.

The toy control unit 210 may check a physical connection of the toy 130 through the MCU 120, S430 and if the physical connection is confirmed, may control motion of the toy 130 through the connected MCU 120 according to the toy motion text command provided by the training content processing unit 220.

In case the toy 130 is not physically connected, the toy control unit 210 may simulate the toy motion by controlling a virtual toy 240 which substitutes for the toy 130, S440. The virtual toy 240 may be implemented in various forms of coding tools including a robot or an RC car preconfigured by the MCU 120.

The training content processing unit 220 may provide a toy motion view on the training content in the form of a pop-up window, the toy motion view showing the state of the toy 130 before and after motion according to a toy motion text command S450.

In the case of a simulation through control of the virtual toy 240, the training content processing unit 220 may provide a change process of the virtual toy 240 on the training content by interpolating toy motion views before and after motion S460.

The user may check successful control of the toy by examining the toy states before and after motion visualized in the form of a toy motion view.

Figure 5:
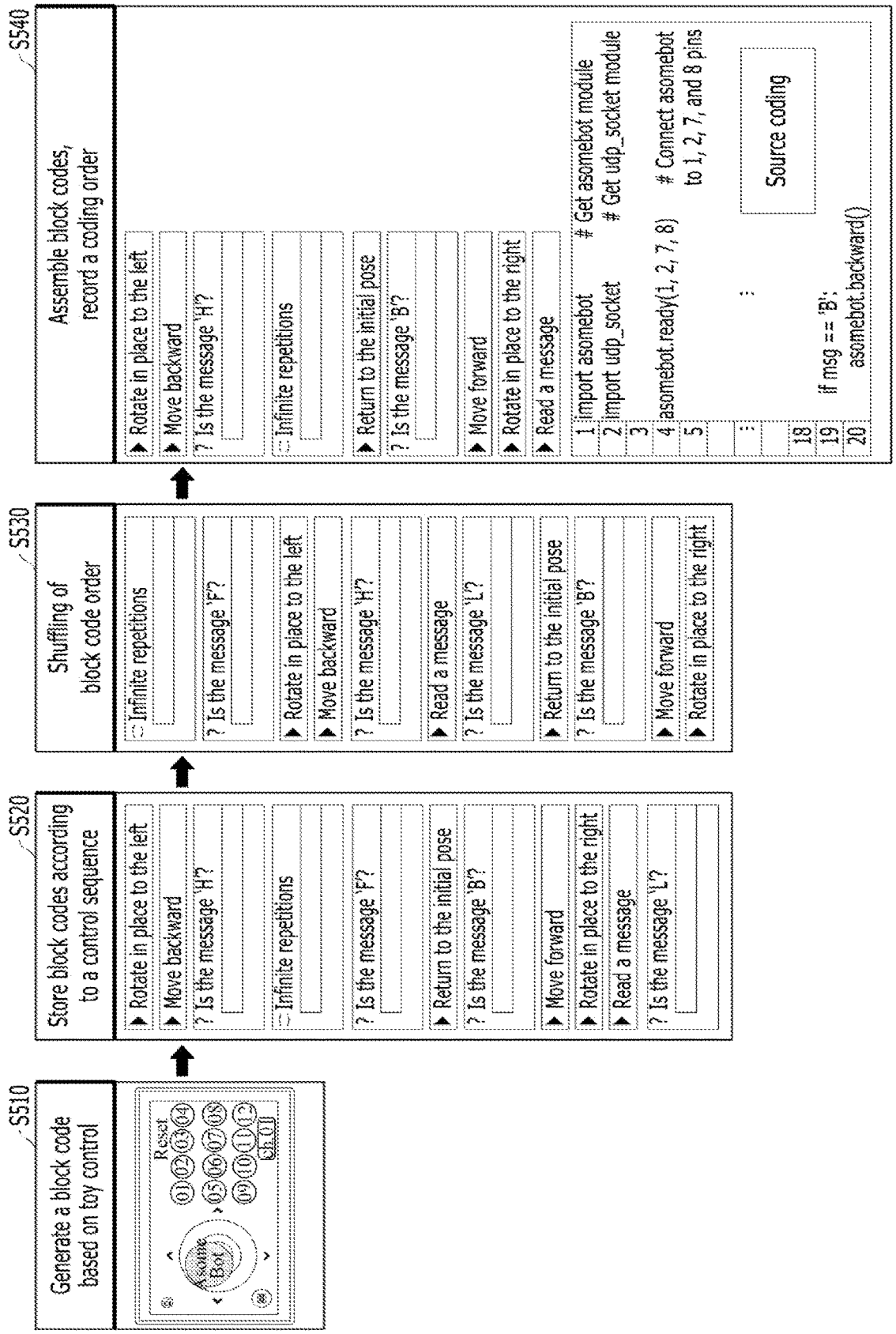
FIG. 5 is a flow diagram illustrating a process of writing block coding-based physical software during the process for running a physical software coding training book of FIG. 2.

FIG. 5 is a flow diagram illustrating a process of writing block coding-based physical software during the process for running a physical software coding training book of FIG. 2.

As shown in FIG. 5, if a user manipulates direction keys 320 and number keys 310 on the toy manipulator 300 to control the toy 130, the apparatus 110 for running a physical software coding training book generates block code in the physical software processing unit 230 based on the user's manipulation on the keys S510. The physical software processing unit 230 may convert a motion process of the toy manipulated by the toy manipulator 300 into a block code.

The physical software processing unit 230 sequentially stores the block code generated according to a manipulation sequence S520, shuffles a block code order, and provides the shuffled block codes on the block coding screen 600, S530.

The physical software processing unit 230 allows the user to code a program by rearranging block codes that are in a mixed order on the block coding screen 600, S540.

Although the present disclosure has been described with reference to preferred embodiments given above, it should be understood by those skilled in the art that various modifications and variations of the present disclosure may be made without departing from the technical principles and scope specified by the appended claims below.

The present disclosure may provide the following effects. However, since it is not meant that a specific embodiment should support all of the effects or include only the effects, the technical scope of the present disclosure should be not regarded as being limited to the descriptions of the embodiment.

One embodiment of the present disclosure may provide an apparatus for running a physical software coding training book which allows coding to be performed in an easy and simple manner without directly writing a code (command) but only through a proper arrangement of block codes provided by training content in which a block code editor is embedded.

One embodiment of the present disclosure may provide an apparatus for running a physical software coding training book which visually provides motion states of a toy or a virtual toy according to coded physical software and thus allows a user to check successful control of the toy.

What is claimed is:

1. An apparatus for running a physical software coding training book, comprising:
a toy control unit being connected to a Micro Control Unit (MCU) via serial communication and configured to control motion of a toy through the MCU;
a training content processing unit being connected to the toy control unit via HyperText Transfer Protocol (HTTP) and configured to provide training content written in HyperText Markup Language (HTML), the training content including motion control commands for the toy; and
a physical software processing unit configured to
directly write block coding-based physical software by embedding a block code editor into the training content and perform control of the toy by coding a program that executes a series of motion by using code blocks, provide a toy manipulator capable of performing real-time control of the toy and convert a motion process of the toy manipulated by the toy manipulator into at least one block code, and randomly shuffling an order of the at least one block code to visually provide a motion process of the toy, thereby allowing a user to rearrange the shuffled at least one block code, wherein, after randomly shuffling the order of the at least one block code, the physical software processing unit visually provides the motion process of the toy, thereby allowing the user to rearrange the shuffled at least one block code, wherein the shuffling of the order of the at least one block code is performed according to the following equation $$|Sh(p_1, p_2, \ldots, p_k)| = \frac{(p_1 + p_2 + \ldots + p_k)!}{p_1! p_2! \ldots p_k!},$$

wherein $(p_1, p_2, \ldots, p_k)$ is a number of function blocks, and $Sh(p_1, p_2, \ldots, p_k)$ is a shuffle permutation of partitions of a totally ordered set, and wherein the toy control unit, the training content processing unit, and the physical software processing unit are each implemented via at least one processor.

2. The apparatus of claim 1, wherein, when a user input is received onto motion control of the toy, the training content processing unit is further configured to generate a toy motion text command based on HTML comments rather than HTML tags and provide the generated toy motion text command to the toy control unit.

3. The apparatus of claim 2, wherein, when the toy motion text command is generated, the training content processing unit is further configured to pop up a toy motion view on the training content, which allows the user to check successful control of the toy by providing the user with toy states before and after motion obtained through the MCU and expressed in a form of text.

4. The apparatus of claim 3, wherein, when a virtual toy is connected while the toy motion text command is being generated, the training content processing unit is further configured to visualize, on the toy motion view, a change process of the virtual toy based on toy states according to at least one motion interpolated adaptively based on the toy states before and after motion and an amount of change in the toy states before and after motion.

5. The apparatus of claim 1, wherein the physical software processing unit is further configured to provide the training content with a motion manipulator that identifies type of the toy, shows, on the block code editor, at least one toy motion which is written through coding by the user, receive the user's input, and provide a corresponding motion code to the block code editor.

6. The apparatus of claim 1, wherein a motion process of the series of motion of the toy is seen visually by selecting a menu button in the block code editor.

7. The apparatus of claim 1, wherein actual code is contained in each of the coding blocks and the actual code is viewed by selecting a menu button in the block code editor.

* * * * *